UNITED STATES PATENT OFFICE.

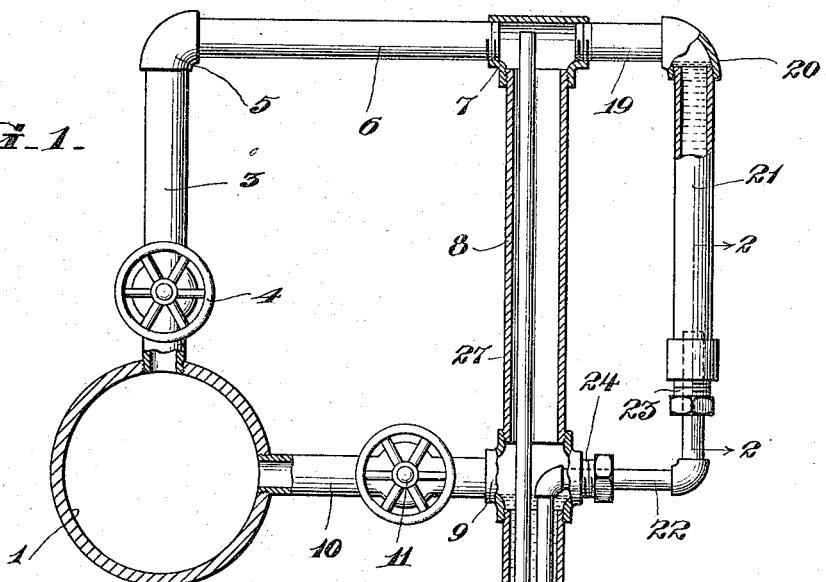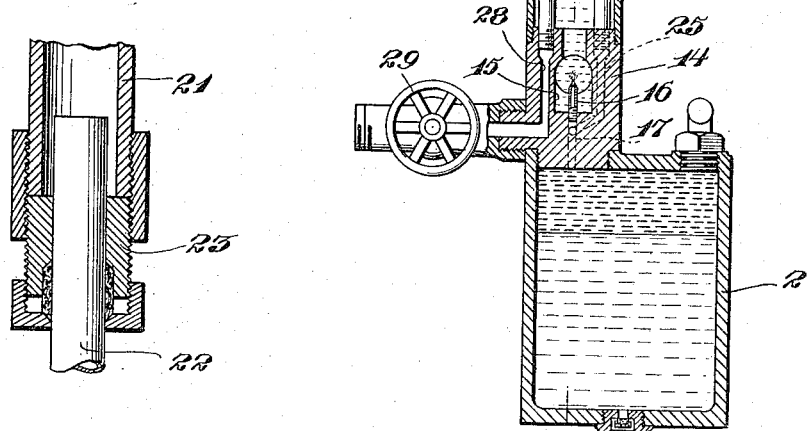

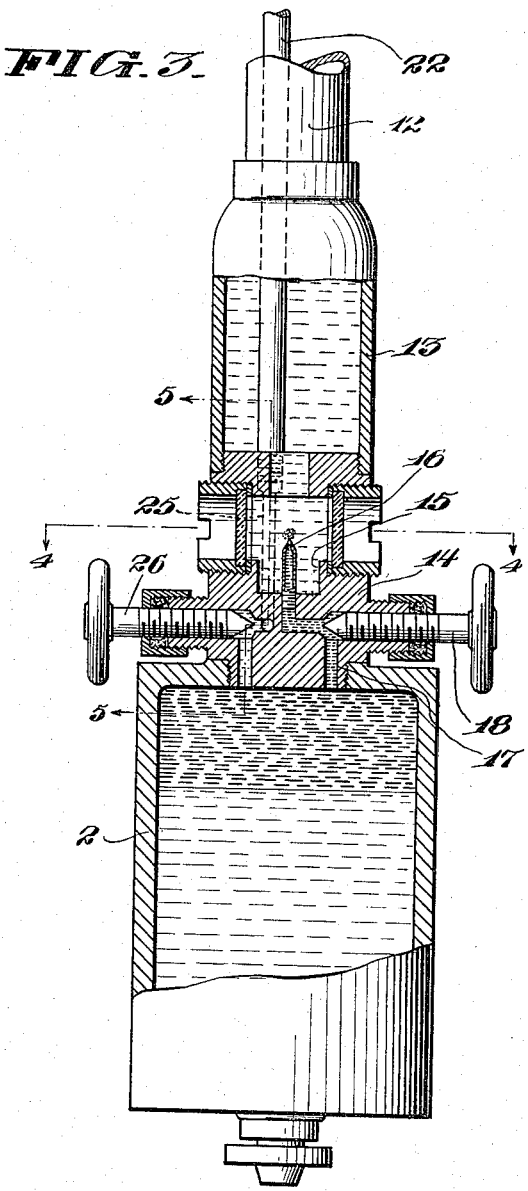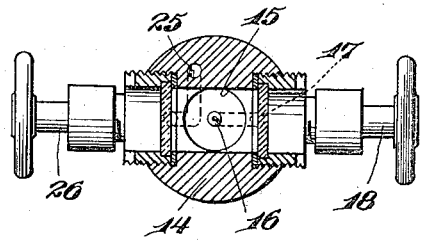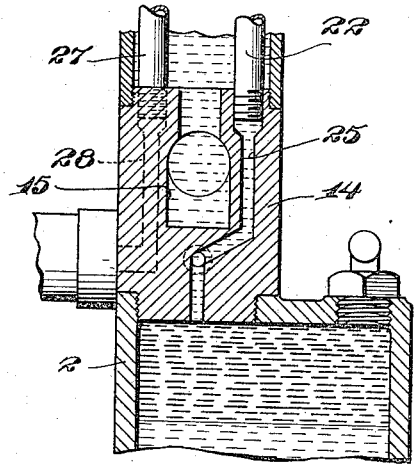

JOHN F. LEWIS, OF PHILADELPHIA, PENNSYLVANIA, ASSIGNOR OF ONE-HALF TO CHARLES A. BAUMGARTNER, OF PHILADELPHIA, PENNSYLVANIA.

LUBRICATOR.

1,195,694. Specification of Letters Patent. Patented Aug. 22, 1916.

Application filed February 15, 1916. Serial No. 78,380.

*To all whom it may concern:*

Be it known that I, JOHN F. LEWIS, a citizen of the United States, residing at Philadelphia, in the county of Philadelphia and State of Pennsylvania, have invented certain new and useful Improvements in Lubricators, of which the following is a specification.

My invention relates to improvements in lubricators, and more particularly to a lubricator designed for feeding lubricant to an overhead steam pipe, the object of the invention being to provide improved means for feeding the lubricant in a thoroughly atomized condition with the steam to effectually commingle with the steam and efficiently lubricate the engine.

A further object is to provide a lubricator of the character described in which the lubricant is fed through a heated body of water, and then commingled with the steam as it returns to the steam pipe so as to impregnate the steam with the lubricant and distribute itself throughout the surfaces to be lubricated.

With these and other objects in view, the invention consists in certain novel features of construction and combinations and arrangements of parts as will be more fully hereinafter described and pointed out in the claims.

In the accompanying drawings: Figure 1 is a view in vertical section partly in elevation illustrating my improvements. Fig. 2 is a fragmentary enlarged view on the line 2—2 of Fig. 1. Fig. 3 is an enlarged view in section on the line 3—3 of Fig. 1. Fig. 4 is a view in transverse section on the line 4—4 of Fig. 3, and Fig. 5 is a view in section on the line 5—5 of Fig. 3.

1 represents the main steam pipe which is shown in a horizontal position, and in a higher plane than the reservoir 2 of my improved lubricator.

A vertical pipe 3 extends upwardly from steam pipe 1, and is provided with a valve 4. Pipe 3 is connected at its upper end by means of an elbow 5 with a horizontal pipe 6, and the latter is connected by a T-coupling 7 with a vertical pipe 8.

Pipe 8 is connected by a coupling 9 with a horizontal pipe 10, the latter communicating with the side of steam pipe 1, and having a valve 11 between its ends. A vertical pipe 12 is connected to the lower portion of coupling 9, and at its lower end is screwed into the upper end of the dome 13 of my improved lubricator. This dome 13 is secured on the head 14, and the latter secured to the top of reservoir 2.

The head 14 is provided with a sight feed chamber 15 into which an upwardly projecting nozzle 16 extends, and this nozzle is connected by a passage 17 with the top of reservoir 2, the flow of lubricant through said passage being controlled by a valve 18.

A short horizontal pipe 19 communicates with the T-coupling 7 in line with pipe 6, and is connected by an elbow 20 with a vertical water pipe 21 to receive the water of condensation. This pipe 21 is connected at its lower end to a smaller pipe 22, which latter projects through a stuffing box 23 in the lower end of pipe 21 to allow for the necessary expansion and contraction.

Pipe 22 extends through a stuffing box 24 in coupling 9, and then extends down through pipe 9 and dome 13, and communicates with a water passage 25 in head 14. This water passage 25 directs the water into the top of reservoir 2, and is controlled by a valve 26. A relatively small steam pipe 27 which also constitutes an air vent pipe, is located in pipe 8, coupling 9, pipe 12, and dome 13, and is secured in the upper end of a steam passage 28 in head 14. It will be understood that the pipes 3, 6, 8, 10, 12, 19, and 21, form a conduit which communicates with the main steam pipe 1, and that this conduit is in communication through the medium of the dome 13 and pipes 22 and 27 with the reservoir and the steam outlet passage 28. This steam passage is controlled by a valve 29, which is just open sufficiently to allow the air to escape and to permit a flow of steam sufficient to heat the head 14 and the water in dome 13 and pipe 12.

It is to be understood that my improved lubricator acts upon the replacement principle rather than upon the displacement principle, and for each drop of lubricant that escapes from the nozzle 16, a drop of water will enter the reservoir 2.

The operation of my improved lubricator is as follows: The water of condensation fills the sight feed chamber 15, dome 13, pipe 12, and coupling 9 up to the level of the bottom of pipe 10, any excess of water passing through the pipe 10 into the steam pipe 1. Water of condensation also fills pipe 22, and pipe 21, up to the level of the bottom of pipe 19, and this level is always maintained by the condensed steam. The feed of lubricant is regulated by the valve 18, and each drop of lubricant passes upwardly through the hot water in sight feed chamber 15, dome 13, and pipe 12, so that when it reaches the surface of the water in coupling 9, it is in a heated finely divided condition ready to be atomized or vaporized by the steam as the latter returns through the pipe 10 to pipe 1, and carry with it the finely divided particles of lubricant. As each drop of lubricant escapes from the reservoir, a drop of water takes its place, and this feed of water is controlled by the valve 26. The valve 29 is open just sufficiently to allow the air and steam to escape, but it is to be understood that only such proportion of steam is permitted to escape as is necessary to heat the portions of the lubricator for the proper vaporization of the lubricant and the outlet passage 28 can be connected with any suitable drain (not shown).

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a steam pipe, of a lubricant reservoir, a conduit communicating with the steam pipe, a head on the reservoir having a passage communicating with the reservoir and the conduit, said passage including a sight feed chamber, a pipe communicating with the head and the conduit to convey steam through the head, and a second pipe communicating with the conduit and with the head for conveying water of condensation to the reservoir, substantially as described.

2. The combination with a steam pipe, of a lubricant reservoir, a conduit communicating with the steam pipe, a head on the reservoir having a passage communicating with the reservoir and the conduit, said passage including a sight feed chamber, a pipe communicating with the head and the conduit to convey steam through the head, a second pipe communicating with the conduit and with the head for conveying water of condensation to the reservoir, and a valve operative to permit steam to enter said head through the first-mentioned pipe, substantially as described.

3. In a lubricator of the character described, the combination with a lubricant reservoir, a head on the reservoir, a dome on the head, a vertical pipe communicating with the dome, a main steam pipe, means connecting the top of the vertical pipe with the top of the main steam pipe, whereby steam from the latter is directed into the upper end of the vertical pipe, an outlet pipe connecting the vertical pipe between the ends of the latter with the side of the steam pipe, a combined steam and vent pipe extending to the upper portion of the vertical pipe and communicating with the head, a water pipe in the vertical pipe directing water into the head, said head having a lubricant outlet passage, and valves controlling the passage of lubricant and water through the head, substantially as described.

4. In a lubricator of the character described, the combination with a lubricant reservoir, a head on the reservoir, a dome on the head, a vertical pipe communicating with the dome, a main steam pipe, means connecting the top of the vertical pipe with the top of the main steam pipe, whereby steam from the latter is directed into the upper end of the vertical pipe, an outlet pipe connecting the vertical pipe between the ends of the latter with the side of the steam pipe, a combined steam and vent pipe extending to the upper portion of the vertical pipe and communicating with the head, a water pipe in the vertical pipe directing water into the head, said head having a lubricant outlet passage, said water pipe at its upper portion extending through the vertical pipe and located outside the same, a valve controlling the passage of steam through the head, and valves controlling the passage of lubricant and water through the head, substantially as described.

5. In a lubricator of the character described, the combination with a main steam pipe, and a lubricant reservoir in a lower plane than the steam pipe, of a vertical pipe communicating with the top of the reservoir, said vertical pipe communicating at its upper end with the steam pipe, and at one side with the steam pipe, means for maintaining a level of water in the vertical pipe, a steam pipe extending through the water in the vertical pipe, and a water pipe containing water of condensation located to one side of the vertical pipe and projecting into and down through a portion of the vertical pipe and communicating with the reservoir, substantially as described.

6. In a lubricator of the character described, the combination with a main steam pipe, and a reservoir for lubricant in a lower plane than the main steam pipe, of an upwardly projecting pipe communicating with the main steam pipe, a substantially horizontal return pipe communicating with the main steam pipe, a substantially vertical pipe communicating with both of said last-mentioned pipes, a steam pipe in the last-mentioned vertical pipe adapted to heat the lubricating apparatus, and a water pipe in the last-mentioned vertical pipe adapted to convey water to the lubricator, substantially as described.

In testimony whereof I have signed my name to this specification in the presence of two subscribing witnesses.

JOHN F. LEWIS.

Witnesses:
S. W. FOSTER,
C. E. POTTS.

Copies of this patent may be obtained for five cents each, by addressing the "Commissioner of Patents, Washington, D. C."